United States Patent
Poornachandran et al.

(10) Patent No.: US 10,057,369 B2
(45) Date of Patent: Aug. 21, 2018

(54) LAYOUT FOR DYNAMIC WEB CONTENT MANAGEMENT

(75) Inventors: Rajesh Poornachandran, Portland, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/993,550

(22) PCT Filed: Dec. 28, 2011

(86) PCT No.: PCT/US2011/067609
§ 371 (c)(1),
(2), (4) Date: Jan. 14, 2014

(87) PCT Pub. No.: WO2013/100974
PCT Pub. Date: Jul. 4, 2013

(65) Prior Publication Data

US 2014/0289640 A1    Sep. 25, 2014

(51) Int. Cl.
*G06F 3/048*  (2013.01)
*H04L 29/08*  (2006.01)
*G06F 17/21*  (2006.01)
*G06F 17/22*  (2006.01)
*H04L 12/24*  (2006.01)

(52) U.S. Cl.
CPC .......... *H04L 67/306* (2013.01); *G06F 17/212* (2013.01); *G06F 17/227* (2013.01); *G06F 17/2247* (2013.01); *H04L 41/22* (2013.01)

(58) Field of Classification Search
None
See application file for complete search history.

(56) References Cited

U.S. PATENT DOCUMENTS

| 7,698,407 B2 | 4/2010 | Mattox, Jr. et al. |
| 2005/0008118 A1 | 1/2005 | Ellenbogen et al. |

(Continued)

FOREIGN PATENT DOCUMENTS

| CN | 104094306 A | 10/2014 |
| EP | 2798606 A1 | 11/2014 |

(Continued)

OTHER PUBLICATIONS

"International Application Serial No. PCT/US2011/067609, Search Report dated Sep. 21, 2012", 3 pgs.

(Continued)

*Primary Examiner* — Hua Lu
(74) *Attorney, Agent, or Firm* — Schwegman Lundberg & Woessner, P.A.

(57) ABSTRACT

A request for content is sent via a client device. The client device negotiates with a server content provider regarding the layout of the content using a dynamically configurable content layout profile describing layout preferences for content. When the content is received from the server content provider, the content is displayed according to the dynamically configurable content layout profile. The server may format the content in accordance with the profile and send the formatted content to the client device via a network. A user of the device may modify the profile dynamically to specify a different layout and receive reformatted content.

30 Claims, 8 Drawing Sheets

(56) References Cited

U.S. PATENT DOCUMENTS

| | | | | |
|---|---|---|---|---|
| 2005/0081148 | A1* | 4/2005 | Deganello | G06F 17/248 715/248 |
| 2007/0271330 | A1* | 11/2007 | Mattox | G06Q 10/00 709/203 |
| 2009/0036105 | A1* | 2/2009 | Carion | G06F 9/451 455/414.1 |
| 2009/0106455 | A1* | 4/2009 | Xu | H04L 51/34 709/248 |
| 2010/0088639 | A1* | 4/2010 | Yach | G06F 1/1626 715/825 |
| 2011/0087776 | A1* | 4/2011 | Tabone | G06F 17/30097 709/224 |
| 2011/0125512 | A1* | 5/2011 | Huang | G06Q 30/06 705/1.1 |
| 2011/0252160 | A1* | 10/2011 | Wu | G06F 17/227 709/246 |
| 2011/0261957 | A1* | 10/2011 | Catrein | H04N 21/234327 380/42 |
| 2011/0283185 | A1 | 11/2011 | Obasanjo et al. | |
| 2013/0097519 | A1* | 4/2013 | Andersson | G06F 9/4443 715/744 |
| 2013/0159920 | A1* | 6/2013 | Scott | G06F 17/3087 715/780 |

FOREIGN PATENT DOCUMENTS

| | | |
|---|---|---|
| KR | 100563553 B1 | 3/2006 |
| TW | 201113728 A | 4/2011 |
| TW | 201337707 A | 9/2013 |
| WO | WO-2013100974 A1 | 7/2013 |

OTHER PUBLICATIONS

"International Application Serial No. PCT/US2011/067609, Written Opinion dated Sep. 21, 2012", 8 pgs.

"Chinese Application Serial No. 201180075955.8, Office Action dated Jun. 29, 2016", W/ Machine Translation, 10 pgs.

"European Application Serial No. 11878895.9, Extended European Search Report dated Oct. 30, 2015", 6 pgs.

"European Application Serial No. 11878895.9, Response filed May 26, 2016 to Extended European Search Report dated Oct. 30, 2015", 9 pgs.

"International Application Serial No. PCT/US2011/067609, International Preliminary Report on Patentability dated Jul. 10, 2014", 10 pgs.

"Taiwanese Application Serial No. 101149339, Office Action dated Jul. 31, 2014", W/ Machine Translation, 29 pgs.

"Taiwanese Application Serial No. 101149339, Office Action dated Dec. 19, 2014", W/ Machine Translation, 7 pgs.

"Taiwanese Application Serial No. 101149339, Response filed Aug. 14, 2015 to Office Action dated Dec. 19, 2014", W/ English Claims, 67 pgs.

"Taiwanese Application Serial No. 101149339, Response filed Oct. 31, 2014 to Office Action dated Jul. 31, 2014", W/ English Claims, 68 pgs.

"Chinese Application Serial No. 201180075955.8, Response filed Nov. 14, 2016 to Office Action dated Jun. 29, 2016", W/ English Translation of Claims, 13 pgs.

"Chinese Application Serial No. 201180075955.8, Office Action dated Mar. 10, 2017", W English Translation, 20 pgs.

"Chinese Application Serial No. 201180075955.8, Response filed May 25, 2017 to Office Action dated Mar. 10, 2017", W/English Claims, 8 pgs.

* cited by examiner

LAYOUT FOR DYNAMIC WEB CONTENT MANAGEMENT

This application is a U.S. National Stage Filing under 35 U.S.C. 371 from International Patent Application Serial No. PCT/US2011/067609, filed on Dec. 28, 2011, the benefit of priority of which is claimed hereby, and is incorporated by reference herein in its entirety.

BACKGROUND

Websites and web apps provide layouts of content in a manner chosen by a developer of the website or web app. Client browsers may allow users to statically configure preferences for display of content, and some websites allow users to customize a viewing environment for their specific services.

Most web layout schemes for a client are managed by cascading style sheet (CSS). CSS is primarily a style sheet language used to describe the look and formatting of a document written in a markup language such as hypertext markup language (HTML), extensible hypertext markup language (XHTML), extensible markup language (XML), scalable vector graphics (SVG), and XML user interface language (XUL). CSS is designed primarily to enable the separation of document content (written in HTML or a similar markup language) from document presentation, including elements such as the layout, colors, and fonts. To manage layout of a page requires complex hand coding of CSS.

Some code such as JavaScript can be used to detect client screen size and resolutions. The content delivery for that client can then be managed to display properly on the client screen.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Client negotiations are used to provide a dynamically configurable content layout on a client device. In addition to previously provided static information such as user agent media types and user agent language, dynamic information including position of media, audio, graphics, screen resolution, orientation, and other information may be provided to the server during the client-server negotiations. This dynamic information may be used by the server to format a layout of pages to be served. In one embodiment, client side CSS and layout preferences are included in the negotiations, allowing developers to build web apps that allow users to dynamically customize web layouts on a real time basis across multiple devices.

Figure 1:
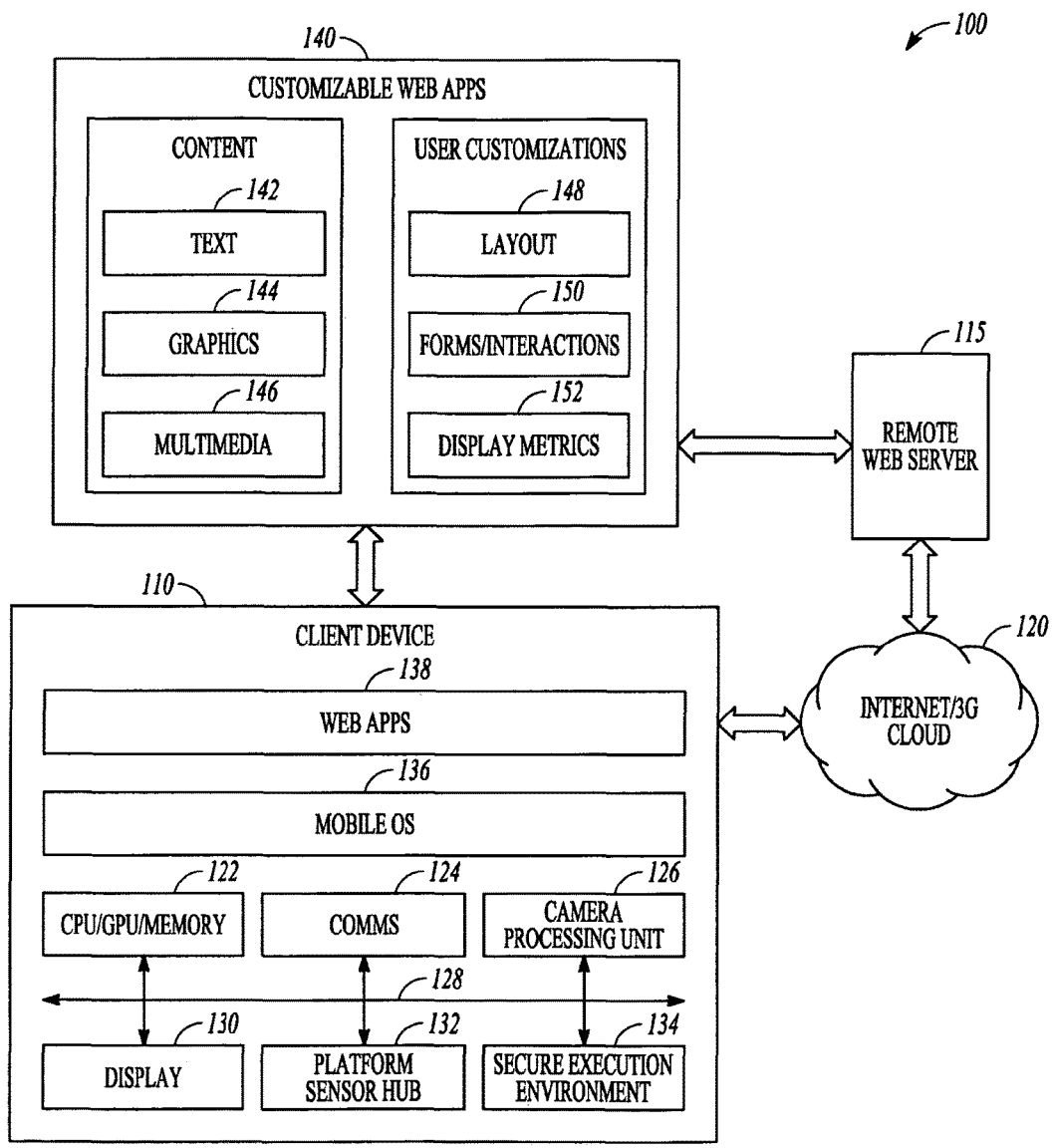
FIG. 1 is a block architecture diagram illustrating interaction between a client device and remote server according to an example embodiment.

FIG. 1 is an example block architecture diagram 100 illustrating interaction between a client device 110 and remote server 115. The client device 110 and server 115 communicate via a wireless network 120 such as the internet or other suitable network in various embodiments. In one embodiment, the wireless device 110 includes a processing unit and memory 122, communications component 124, and camera processing unit 126 coupled to an internal communications bus 128. A display 130, platform sensor hub 132, and secure execution environment 134 are also coupled to the bus 128.

Processing unit and memory 122 contains a central processing unit having one or more types of memory such as random access memory, read only memory, static random access memory and others as desired. The platform sensor hub 132 may be coupled to multiple different sensors, such as proximity sensors, inertial sensors for sensing orientation of the device 110, pressure sensors, light sensors for sensing ambient light, global positioning sensors (GPS) and others. In one embodiment, the platform sensor hub 132 may provide an action vector that represents how a user is using the device, including orientation of the device, navigation skills of the user, granularity of information that the user can handle, etc.

Secure execution environment 134 provides an isolated or host independent and tamper proof, secure compute and storage environment. It may be used to run sensitive apps or applications without being visible to other components of the device unless desired.

A mobile operating system (OS) 136 sits on top of the above hardware components and provides operating code to support web applications or web apps 138. A web app example interface 140 is illustrated and shows some selectable icons for customization of layouts of content by a user of the device. The user interface provides the ability to create a profile describing content preferences that may include but are not limited to text 142, graphics 144, and multimedia 146. These selectable icons may be used to pull up a template to specify preferences for the content. User customizations of the content include layout 148, forms and interactions 150, and display metrics 152.

The user customizations allow the user to specify many different preferences. Examples include the ability to indicate that videos are preferred at the end of a page, placing text near the beginning of the page. Others may desire to see pictures first, followed by text. Still others may prefer to see quick video highlights first. Some may desire to have hot keys to zoom in on content. In further embodiments, such as on smart phones, multiple screens may be scrolled between, and the user may specify which of these screens should contain different forms of content and in what format. For bandwidth limited devices, the user may indicate that videos should not be automatically loaded and played, but rather tied to an icon to select whether or not to play them.

In various embodiments, a user profile with these preferences is created. It may be stored on the device, or on other networked storage devices, sometimes referred to as the cloud, as it is visible from any authorized device on a network. When a user selects a website or an app, the server may obtain the profile and use it to customize the layout and provision of content to the user's device. The user may have multiple customization profiles corresponding to different ways that a user uses a device, such as for browsing, working, gaming, etc., and may also have different customization profiles for different devices that the user uses. Devices may also have different profiles corresponding to different users of the devices. Layout preference(s) and profiles stored in a remote cloud server's storage may be applicable for multiple device(s) and their corresponding user(s). Thus, each customization profile is accessible via an identifier corresponding to user ID, mode, and device information.

Figure 2:
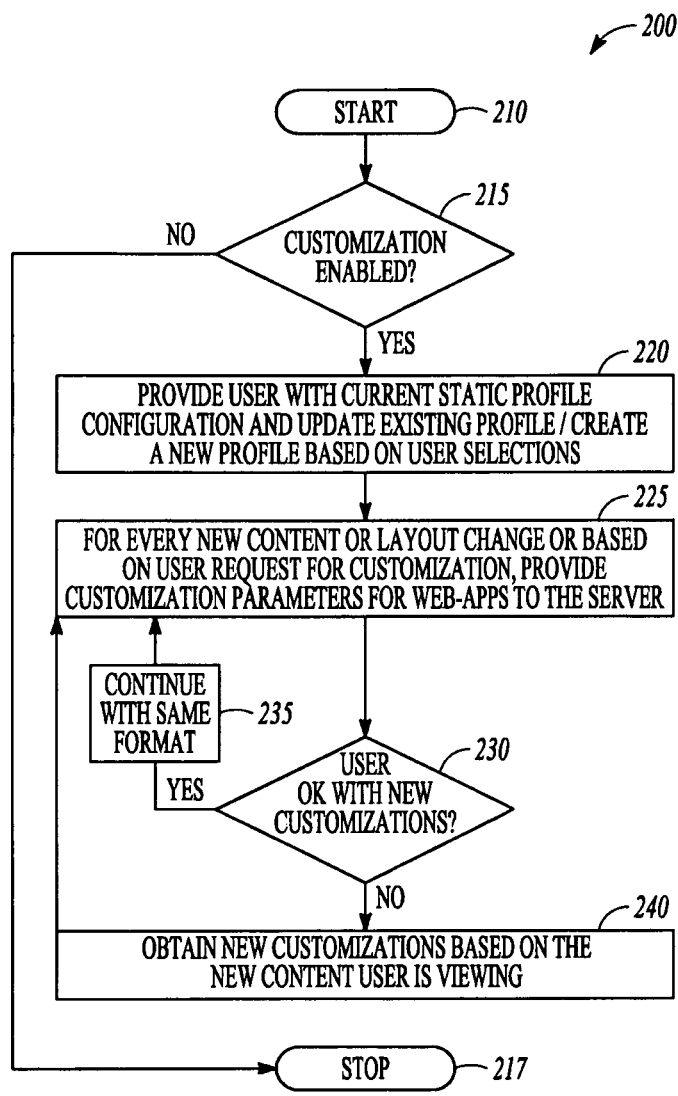
FIG. 2 is a flowchart illustrating operational flow of a method of supporting dynamic customization on a client side according to an example embodiment.

FIG. 2 is a flowchart illustrating operational flow of a method 200 of supporting dynamic customization on a client side. The method 200 starts at 210 when the user is using the device. If customization is not enabled as indicated at 215, the process stops at 217, and the content is delivered to the device as controlled by the server or static client configurations. In some embodiments, a service provider may require that certain policies or license limitations to which a user may have agreed to, be enforced. In such circumstances, such as where a customer agrees to receive content in a specified format or fashion, the user may be notified that the customizations cannot be enabled because of an agreed to license's terms and conditions. If customization is enabled, the user at 220 is provided with the current static profile configuration via interface 140, and the profile is updated by the user. Alternatively, the content is delivered in accordance with an existing profile at 215 prior to the user being provided interface 140. The interface 140 may be selectable by the user while viewing the content in some embodiments.

The customization user interface 140 provides the user with the current profile configuration and provides options to configure the web apps based on device metrics and user preference including screen size, resolutions, multitasking, refresh rate, etc. Based on the user chosen options, a new profile is created or an existing profile is updated. Although the profiles themselves are static, a user can dynamically customize the profiles in real time by changing the layouts and other metrics. This is accomplished in one embodiment by extending hypertext markup language version 5 (HTML5) to provide user preferences as an input to a remote web server so the server can customize the layout accordingly. As of the date of filing this application, HTML5 is still under development and is the fifth version of the language that improves support for the latest multimedia while maintaining easy readability by humans. Many features of HTML5 are compatible with mobile devices. Application programming interfaces have been integrated into HTML5.

At 225, for every new content or layout change, or based on a user request for customization, customization parameters for the web page or apps are provided to the server. At 230, the user is asked if the new customizations are acceptable. If yes, the same layout and format is continued at 235 and the method continues to handle changes at 225. If the new customizations are not acceptable at 230, new customizations may be obtained based on new content that the user is viewing at 240. The method then returns to 225, where changes continue to be handled.

Figure 3:
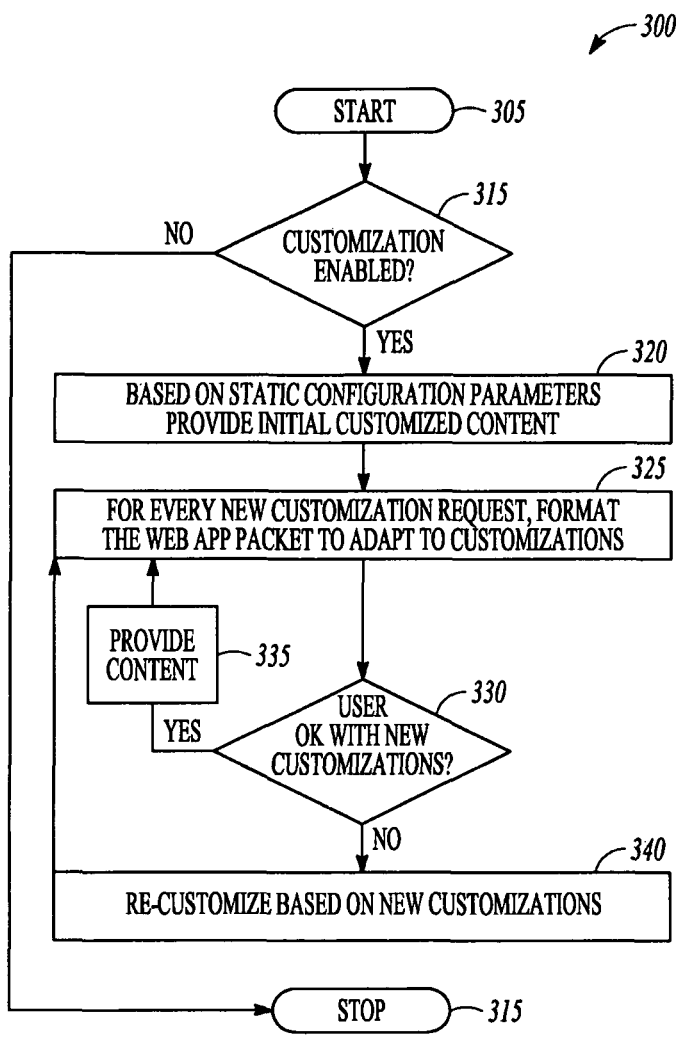
FIG. 3 is a flowchart illustrating operational flow of a method of supporting dynamic customization on a server side according to an example embodiment.

FIG. 3 is a flowchart illustrating operational flow of a method 300 of supporting dynamic customization on a server side. Method 300 starts at 305. The server, during negotiations with the client, determines if customization is enabled at 310. If not, the dynamic customization method 300 stops at 315 and content is delivered to the device as before, without dynamic customization. In some embodiments, a service provider may not allow customization due to license restrictions as described above or for other reasons. If customization is enabled at 310, based on the static configuration parameters from the customization profile, initial customized content is provided. The customization profile may be obtained from the device based on negotiations, or an identifier may be provided at the server to obtain the customization profile from an alternative location, such as the cloud.

At 325, for every new customization request, a web app packet is formatted to adapt according to the configuration parameters from the customization profile. If the new customizations are acceptable to the user as determined at 330, the content is provided as customized at 335, and the method returns to 325 to await further requests. If the customizations are not acceptable to the user, re-customization may be performed at 340 based on new customization configuration parameters dynamically provided by the user. The method then continues at 325.

In one embodiment, a World Wide Web Consortium (W3C) hypertext transfer protocol (HTTP) protocol for client negotiations for user layout preference is extended to facilitate dynamic content configuration and layout. The CSS for the client browser is also extended. The client side CSS may be used for formatting the content such that the layout of media, graphics, text, and other content can be dynamically positioned based on user preference and with respect to device orientation and display properties. The client side CSS may be shipped with the device in some embodiments. The user can also configure the CSS by selecting sample content. The client browser side CSS in one embodiment works independently of the server side CSS, and overrides the content format provided by the server. The content will be displayed in the layout enforced by the client side.

Figure 4:
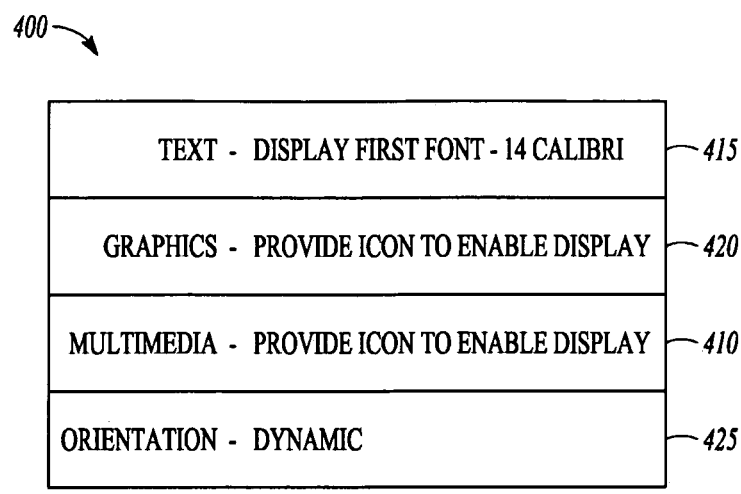
FIG. 4 is an example customization profile with various selected parameters according to an example embodiment.

FIG. 4 is an example customization profile 400 with various selected parameters. In profile 400, the user may be using a slower smart phone, such as one with 2G communications capabilities. The user does not want to start videos when opening an app, or navigating to a web page. Hence multimedia is associated with a parameter at 410 that instructs the server to provide an icon to enable display of the video if desired by the user. The video will not start to load until the icon is selected. This reduces the amount of content that will initially load, resulting in a faster display of the content.

In addition, the user may want text to be displayed first as indicated at 415 with a larger easy to read font, so reading glasses may not be needed. Graphics can also slow down display of content in slower devices, so at 420, the user has indicated that an icon to enable display of the graphics or video is desired as opposed to automatically loading the graphics or video. Finally, the orientation of the device is dynamic as indicated at 425, so sensed orientation will also be provided to the server to enable the server to format the content accordingly. The user may also specify a fixed orientation if desired. Each of the parameters may be modified by the user dynamically in various embodiments.

Figure 5A:
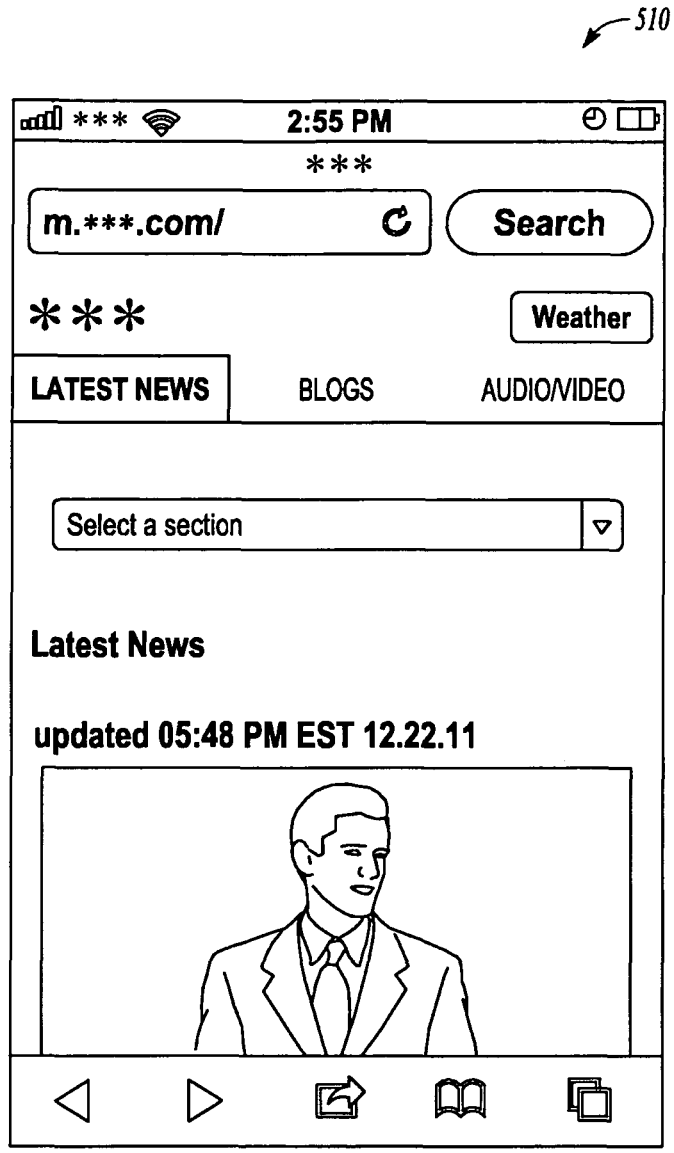
FIGS. 5A and 5B illustrate two versions of an example content page being show in portrait and in a user specified format according to an example embodiment.
Figure 5B:
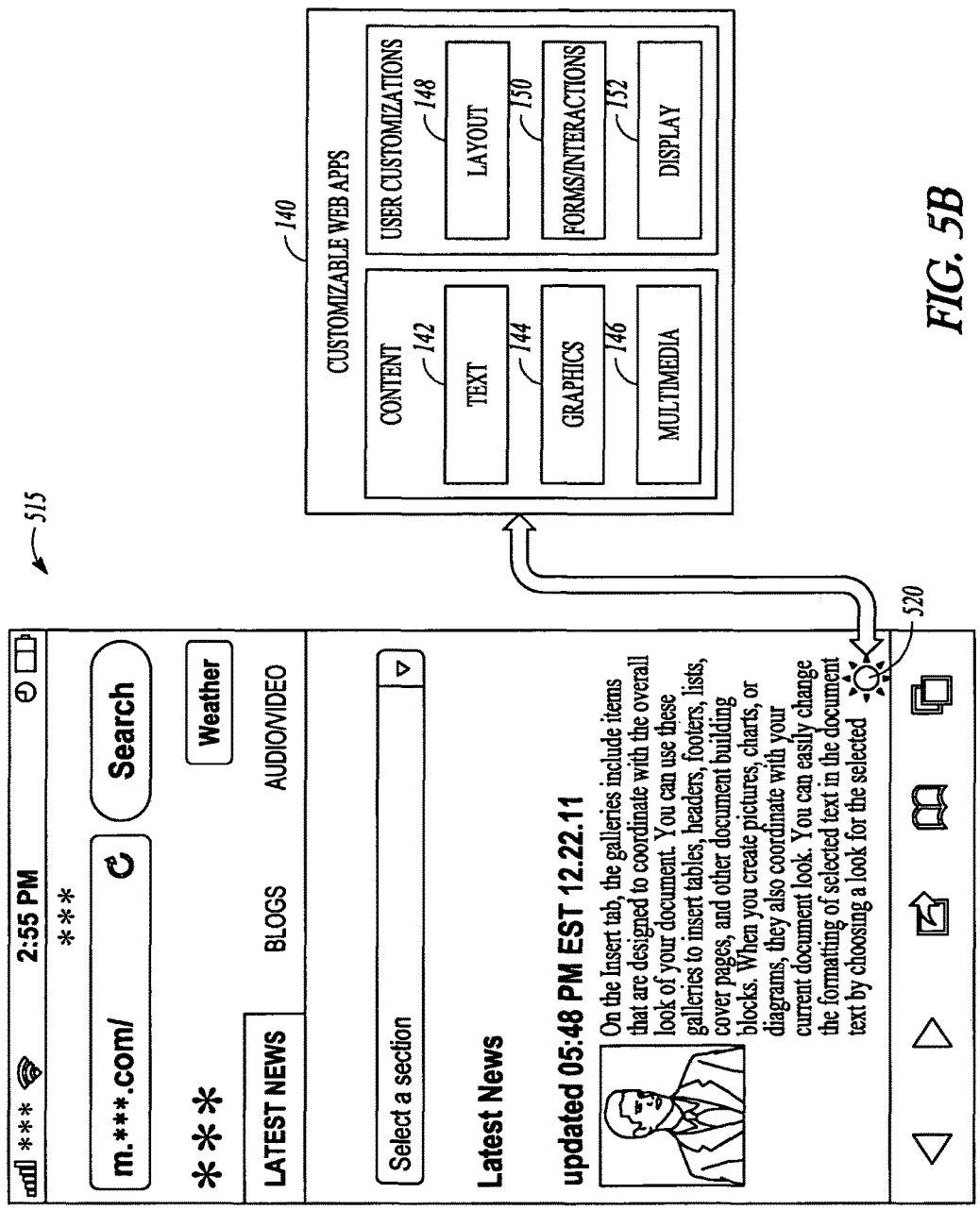

FIGS. 5A and 5B illustrate two versions of an example content page being show in portrait mode at page 510 and in a user specified format at page 515. In this example, the content page is an example home page. Page 510 displays an image represented as a stick figure for simplicity. Page 510 uses CSS based page layout for the device and screen, and can be displayed in landscape or portrait mode. The landscape or portrait pages are for a mobile version of the home page on a smart phone. In both landscape and portrait versions of page 510, the user is forced to scroll the webpage to read the news or text content although these are mobile versions of the content.

Page 515 shows a reformatted home page when a user has the option to specify that the user is interested in receiving a "news summary" with photos as "thumbnails" which the user can zoom in on as desired. Page 510 is reformatted in accordance with user preferences, showing the same home page, but with a thumbnail for the image. The layout changed to show a smaller thumbnail image with text of an article displayed.

A reformat button 520 is illustrated on page 515, allowing the user to invoke the customization interface 140 illustrated in FIG. 1. Utilizing the interface 140, the user may specify one or more user preferences in terms of text, graphics, multimedia, etc., based on device orientation and display capabilities.

Via interface 140, users may configure browser settings that may be exchanged during HTTP 1.1 protocol header under client-negotiations. Based on the page layout setting the web server will serve/dynamically change the page layout or reconfigure CSS layout using client received parameters to change the page layout.

During the HTTP client negotiations, the client request for a specific page may also include the client requested page layout pre-configured in the web browser by the user. The requested page layout may be configured in a way that user can select main body, left, right margins text, video, images displayed as per user configured options. Reformatting in accordance with the requested page layout configuration may be done either per site or in a generic way for all pages provided by the web server or on-demand basis. To be done generically, the web-server may be instructed to use the client assigned display/screen layout for the web pages.

Figure 6:
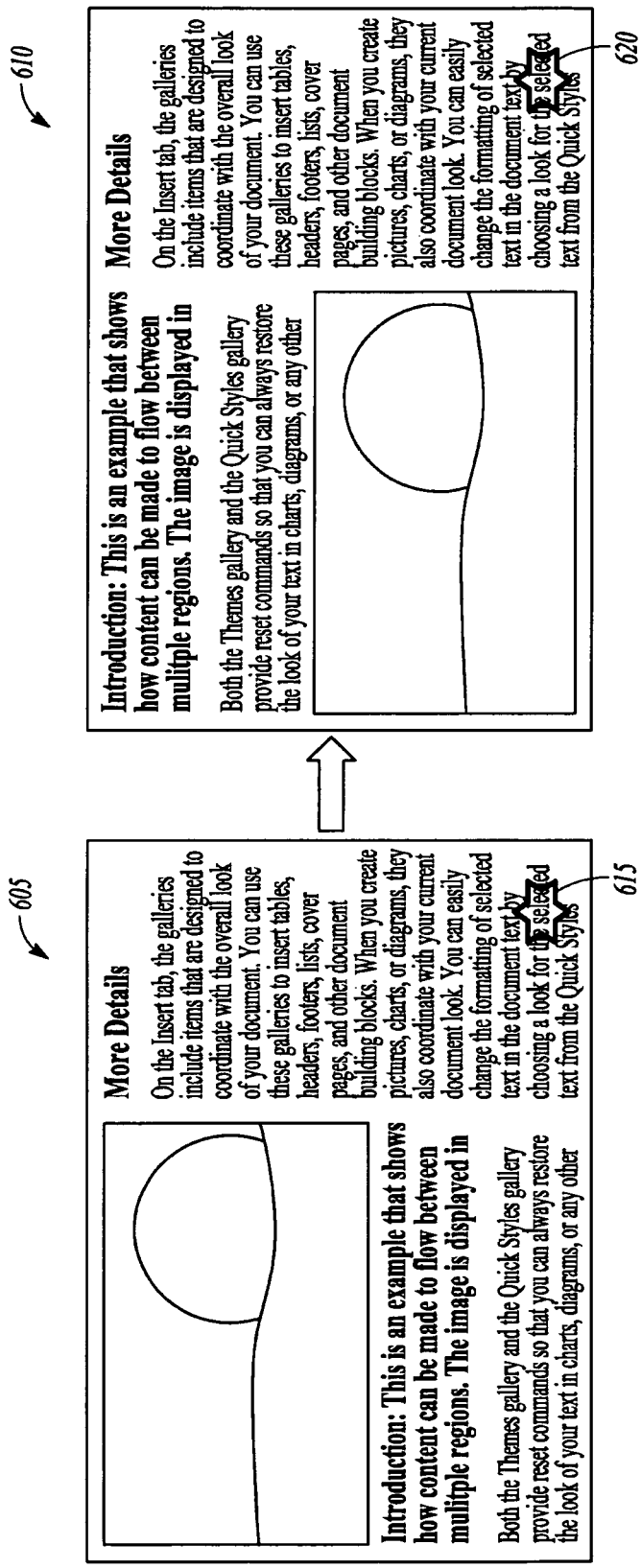
FIG. 6 illustrates an example page before customization and after the page has been customized according to an example embodiment.

FIG. 6 illustrates an example page at 605 before customization, and at 610 after the page has been customized. The page contains text and an image that shows how content may be configured to flow from region to region on a page using CSS regions. An image is shown in region A, while the text of an article flows from a region 1 successively to regions 2, 3, and 4, starting with a different style in region 1. CSS regions provide the ability to associate flow of content to a set of regions and have the content be threaded between the regions. The content that falls into-a different region may be subjected to an additional style referred to as region styling. The first line may also be subject to a different style, defined by a first-line pseudo element selector.

CSS pseudocode for the page 605 may be written as:

```
<div id=article>
  <p><img src="sunset" alt="">
  <h1>Introduction</h1>
  <p>This is an example...
  <h1>More Details</h1>
  <p>This illustrates...
  <p>Then, the example...
  <p>Finally, this...
</div>
#article {
  display: "A A 4"
           "A A 4"
           "1 1 4"
           "2 3 4";
  chains: 1 2 3 4 }
#article > * { position: 1 }
#article img { position: A }
::slot(@) {
  font-weight: bold;
  color: #0C3D5F;
  font-size: larger }
h1::slot(@) {
  color: crimson;
  display: run-in }
```

The customized page 610 shows the same content arranged differently by the user specifying content layout preferences. Both pages 605 and 610 may provide an icon indicated at 615 and 620 respectively which may be selected such as by clicking on the icon to invoke the interface 140, or other interface for allowing a user to customize the layout of content as described above. For instance, customized page 610 illustrates how a user prefers that an article text start near the top of a page. Once selected by the user, the new user configured layout preferences may be sent to a server, and the CSS code defining the layout of the page will be dynamically changed to that shown at 610. In one embodiment, the simple change may result in a change of two lines of code from the CSS pseudocode specified above. Lines

```
#article > * { position: 1 }
#article img { position: A }
are dynamically changed to:
    #article > * { position: A }
    #article img { position: 1 }
``` resulting in article text starting in the first region, A, as opposed to the image appearing the in the first region, A. The image is now shifted to region 1.

In one embodiment, the interface 140 allows the user to drag and drop regions in desired positions to specify preferences. Other common preferences may be provided for selection with the use of buttons and menu choices, such as the use of links using icons or thumbnails as opposed to full images. Selection of a link would then display a full image.

In some embodiments, the user may directly configure the page layout by selecting the icon on the web page being viewed. The user interface 140 may be implemented via any web programming techniques, such as Java script, and sent to a web server as page layout parameters in some embodiment. The user interface allows the user to customize the layout and dynamically create new CSS code for a page. The new layout may be stored on a client platform with client cookies such that when a user visits the website, the web server can detect preferred layout configurations during client negotiations. The new dynamic CSS created can be loaded if this file is already detected based on cookies information and if this does not exist then user could create it. In some embodiments, the browser on the client may perform the CSS modifications on receipt of the content and configure the layout of the content accordingly.

In some embodiments, during HTTP client negations, a client request for a specific page may also send the client requested page layout pre-configured in the web browser by the user. The layout may allow the user to select main body, left, right margins text, video, images displayed as per user configured options. The options may be specified either per site or generically for all pages provided by a web server or servers or on-demand basis. In such embodiments, the web-server may be configured to use the client assigned display/screen layout for web pages.

Figure 7:
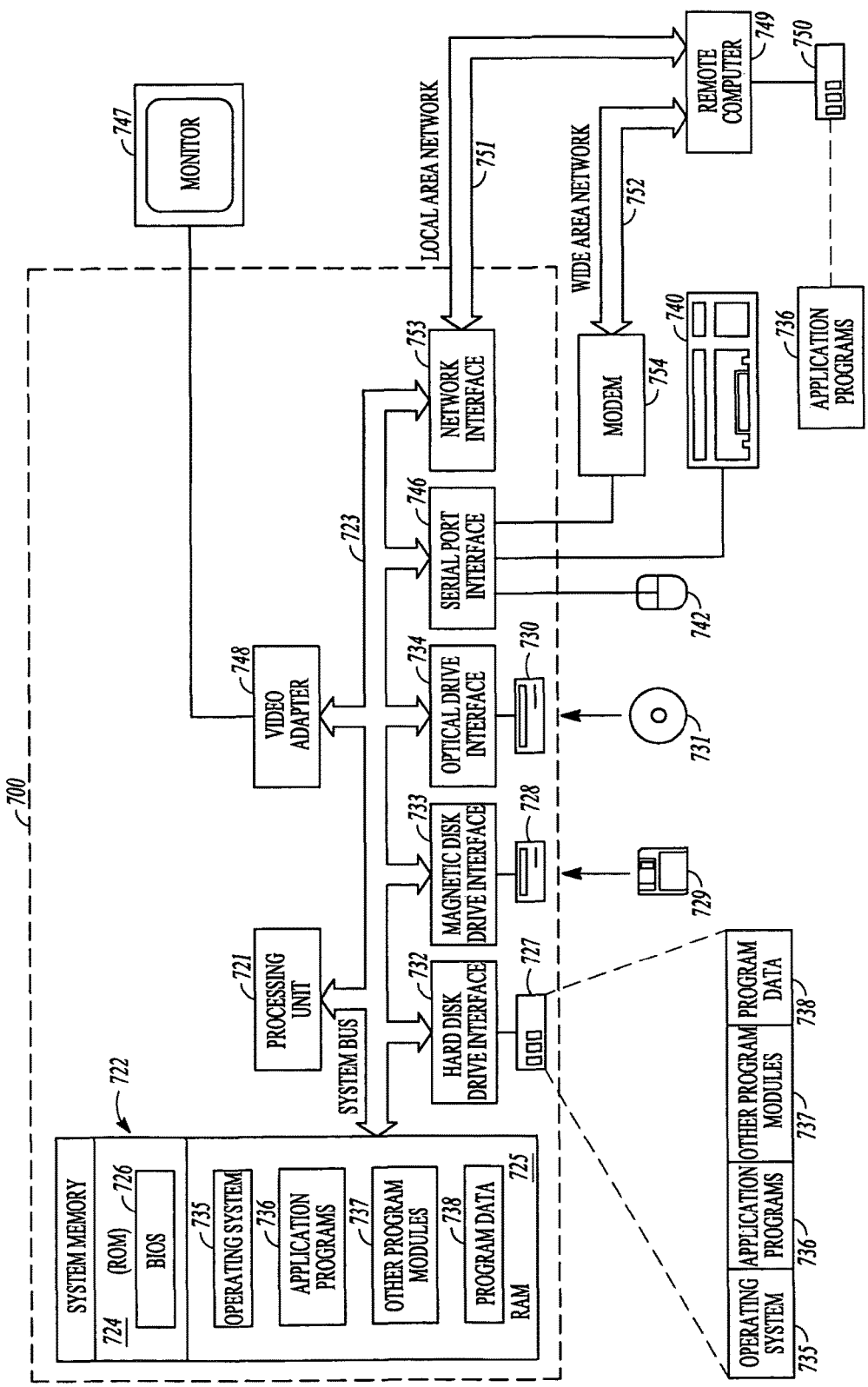
FIG. 7 is a block diagram of a computer system to implement methods on either a device or server side according to various embodiments.

FIG. 7 is a block diagram of a computer system to implement methods on either the device or server side according to various embodiments described above. In the embodiment shown in FIG. 7, a hardware and operating environment is provided that is applicable to any of the servers and/or clients shown in the other Figures. Clients may also be implemented in portable hand held devices such as smart phones and tablets as illustrated in FIG. 1.

As shown in FIG. 7, one embodiment of the hardware and operating environment includes a general purpose computing device in the form of a computer 700 (e.g., a personal computer, workstation, or server), including one or more processing units 721, a system memory 722, and a system link 723 that operatively couples various system components including the system memory 722 to the processing unit 721. There may be only one or there may be more than one processing unit 721, such that the processor of computer 700 comprises a single processing unit, or a plurality of processing units, commonly referred to as a multiprocessor or parallel-processor environment. In various embodiments, computer 700 is a conventional computer, a distributed computer, or any other type of computer.

In one embodiment, at least one of the processing units 721 is a part of a secure execution environment that provides an isolated or host independent and tamper proof, secure compute and storage environment. It may be used to run sensitive apps or applications without being visible to other components of the system unless desired. In the case of a mobile device, the operating environment includes a mobile operating system that sits on top of the above hardware components and provides operating code to support web applications or web apps.

In one embodiment, Layout preferences for sensitive content like financial, media (e.g, movies, games, etc) may utilize the secure execution environment.

The system link 723 can be any of several types of bus structures including a memory bus or memory controller, a peripheral bus, an interconnect, and a local bus using any of a variety of bus architectures. The system memory can also be referred to as simply the memory, and, in some embodiments, includes read-only memory (ROM) 724 and random-access memory (RAM) 725. A basic input/output system (BIOS) program 726, containing the basic routines that help to transfer information between elements within the computer 700, such as during start-up, may be stored in ROM 724. The computer 700 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 couple with a hard disk drive interface 732, a magnetic disk drive interface 733, and an optical disk drive interface 734, respectively. The drives and their associated computer-readable media provide non volatile storage of computer-readable instructions, data structures, program modules and other data for the computer 700. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 729, optical disk 731, ROM 724, or RAM 725, including an operating system 735, one or more application programs 736, other program modules 737, and program data 738. Programming for implementing one or more processes or method described herein may be resident on any one or number of these computer-readable media.

A user may enter commands and information into computer 700 through input devices such as a keyboard 740 and pointing device 742. Other input devices (not shown) can include a multi-touch screen, microphone, joystick, game pad, satellite dish, scanner, or the like. These other input devices are often connected to the processing unit 721 through a serial port interface 746 that is coupled to the system bus 723, but can be connected by other interfaces, such as a parallel port, game port, or a universal serial bus (USB). A monitor 747 or other type of display device can also be connected to the system bus 723 via an interface, such as a video adapter 748. The monitor 747 can display a graphical user interface for the user. In addition to the monitor 747, computers typically include other peripheral output devices (not shown), such as speakers and printers.

The computer 700 may operate in a networked environment using logical connections to one or more remote computers or servers, such as remote computer 749. These logical connections are achieved by a communication device coupled to or a part of the computer 700; the invention is not limited to a particular type of communications device. The remote computer 749 can be another computer, a server, a router, a network PC, a client, a peer device or other common network node, and typically includes many or all of the elements described above I/O relative to the computer 700, although only a memory storage device 750 has been illustrated. The logical connections depicted in FIG. 7 include a local area network (LAN) 751 and/or a wide area network (WAN) 752. Such networking environments are commonplace in office networks, enterprise-wide computer networks, intranets and the internet, which are all types of networks.

When used in a LAN-networking environment, the computer 700 is connected to the LAN 751 through a network interface or adapter 753, which is one type of communications device. In some embodiments, when used in a WAN-networking environment, the computer 700 typically includes a modem 754 (another type of communications device) or any other type of communications device, e.g., a wireless transceiver, for establishing communications over the wide-area network 752, such as the internet. The modem 754, which may be internal or external, is connected to the system bus 723 via the serial port interface 746. In a networked environment, program modules depicted relative to the computer 700 can be stored in the remote memory storage device 750 of remote computer, or server 749. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. An example machine readable storage device having instructions stored thereon to cause a specifically programmed machine to implement a method of reformatting content, the method comprising: receiving a request for content from a client device via a network; negotiating with the client device via the network regarding the layout of the content using a dynamically configurable content layout profile describing layout preferences for content; formatting the content in accordance with the dynamically configurable layout profile; and sending the formatted content to the client device via the network.
2. The example machine readable storage device of example 1 and further comprising retrieving the dynamically configurable content layout profile from a remote storage device.
3. The example machine readable storage device of any one of examples 1-2 wherein the dynamically configurable content layout profile describes layout preferences including at least text, graphics, and multimedia content, and wherein the layout preferences include at least size, rotation, position preferences and video and graphics loading preferences.
4. The example machine readable storage device of any one of examples 1-3 wherein the profile describes layout preferences using a markup language.
5. The example machine readable storage device of example 4 wherein the markup language is a hypertext markup language.
6. The example machine readable storage device of example 5 wherein the hypertext markup language comprises an extended hypertext markup language version 5.
7. The example machine readable storage device of any one of examples 1-6 wherein the method further comprises: receiving a dynamically modified profile; reformatting the content based on the received modified profile; and sending the reformatted content to the client device via the network.
8. An example system for reformatting content to send to a client device, the system comprising: a receiver to receive a request for content from the client device via a network; a negotiator module to negotiate with the client device via the network regarding the layout of the content using a dynamically configurable content layout profile describing layout preferences for content; a formatter to format the content in accordance with the dynamically configurable layout profile; and a transmitter to send the formatted content to the client device via the network.
9. The example system of example 8 wherein the receiver is configured to retrieve the dynamically configurable content layout profile from a remote storage device.
10. The example system of any one of examples 8-9 wherein the dynamically configurable content layout profile describes layout preferences including at least text, graphics, and multimedia content, and wherein the layout preferences include at least size, rotation, position preferences and video and graphics loading preferences.
11. The example system of any one of examples 8-10 wherein: the receiver is configured to receive a dynamically modified profile; the formatter is configured to reformat the content based on the modified profile; and the transmitter is configured to send the reformatted content to the client device via the network.
12. The example of any one of examples 8-11 wherein the profile describes layout preferences using a markup language.
13. The example system of example 12 wherein the markup language is a hypertext markup language.
14. The example system of example 13 wherein the hypertext markup language comprises an extended hypertext markup language version 5.
15. An example method of reformatting content, the method comprising: receiving a request for content from a client device via a network; negotiating with the client device via the network regarding the layout of the content using a dynamically configurable content layout profile describing layout preferences for content; formatting the content in accordance with the dynamically configurable layout profile; and sending the formatted content to the client device via the network.
16. The example method of example 15 and further comprising retrieving the dynamically configurable content layout profile from a remote storage device.
17. The example method of example 15 or 16 wherein the dynamically configurable content layout profile describes layout preferences including at least text, graphics, and multimedia content, and wherein the layout preferences include at least size, rotation, position preferences and video and graphics loading preferences.
18. The example method of example 17 wherein the profile describes layout preferences using a markup language.
19. The example method of example 18 wherein the markup language is an extended version of a hypertext markup language.
20. The example method of any one of examples 15-19 and further comprising: receiving a dynamically modified profile; reformatting the content based on the received modified, profile; and sending the reformatted content to the client device via the network.
21. An example method of reformatting content, the method comprising: sending a request for content via a client device; negotiating with a server content provider regarding the layout of the content using a dynamically configurable content layout profile describing layout preferences for content; receiving content from the server content provider; and displaying the received content according to the dynamically configurable content layout profile.
22. The example method of example 21 wherein the received content is fully laid out in accordance with the dynamically configurable content layout profile.
23. The example method of example 21 or 22 wherein the dynamically configurable content layout profile is stored on the client device.
24. The example method of any one of examples 21-23 wherein the dynamically configurable content layout profile is stored on storage remote from the client device and is referenced by the client device during the negotiations with the server content provider.

25. The example method of example 24 wherein the storage includes profiles for at least one device and at least one corresponding user of the at least one device.

26. The example method of any one of examples 21-25 wherein the dynamically configurable content layout profile describes layout preferences for at least text, graphics, and multimedia content.

27. The example method of example 26 wherein the layout preferences include at least size, position, and rotation preferences.

28. The example method of any one of examples 26-27 wherein the layout preferences include video or graphics loading preferences.

29. The example method of any one of examples 26-28 wherein the layout preferences include sensed client device orientation.

30. The example method of any one of examples 26-29 wherein the profile describes layout preferences using a markup language.

31. The example method of example 30 wherein the markup language is a hypertext markup language.

32. The example method of example 31 wherein the hypertext markup language comprises an extended hypertext markup language version 5.

33. The example method of any one of examples 21-32 and further comprising: providing an interface to users to facilitate changing of layout preferences while content is being displayed; and updating the display of the content based on the changed layout preferences.

34. The example method of example 33 wherein layout preferences for selected content are handled in a secure execution environment.

35. An example machine readable storage device having instructions stored thereon to cause a specifically programmed machine to implement a method or reformatting content, the method comprising: sending a request for content via a client device; negotiating with a server content provider regarding the layout of the content using a dynamically configurable content layout profile describing layout preferences for content; receiving content from the server content provider; and displaying the received content according to the dynamically configurable content layout profile.

36. The example machine readable storage device of example 35 wherein the received content is fully laid out in accordance with the dynamically configurable content layout profile.

37. The example machine readable storage device of example 35 or 36 wherein the dynamically configurable content layout profile is stored on the client device.

38. The example machine readable storage device of example 35 or 36 wherein the dynamically configurable content layout profile is stored on storage remote from the client device and is referenced by the client device during the negotiations with the server content provider.

39. The example machine readable storage device of example 38 wherein the storage includes profiles for at least one device and at least one corresponding user of the at least one device.

40. The example machine readable storage device of example 35 or 36 wherein the dynamically configurable content layout profile describes layout preferences for at least text, graphics, and multimedia content.

41. The example machine readable storage device of example 40 wherein the layout preferences include at least size, position, and rotation preferences.

42. The example machine readable storage device of any one of examples 40-41 wherein the layout preferences include video or graphics loading preferences.

43. The example machine readable storage device of any one of examples 40-42 wherein the layout preferences include sensed client device orientation.

44. The example machine readable storage device of any one of examples 40-43 wherein the profile describes layout preferences using an extended hypertext markup language.

45. The example machine readable storage device of any one of examples 35-44 and further comprising: providing an interface to users to facilitate changing of layout preferences while content is being displayed; and updating the display of the content based on the changed layout preferences.

46. The example machine readable storage device of any one of examples 35-45 wherein layout preferences for selected content are handled in a secure execution environment.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. At least one non-transitory machine readable storage device having instructions stored thereon to cause a specifically programmed machine to implement a method of reformatting content, the method comprising:
   receiving a request for content from a client device via a network;
   obtaining static content format information for the client device;
   negotiating with the client device via the network regarding the layout of the content using a dynamically configurable content layout profile describing layout preferences for content when combined with the static content format information, the negotiating including:
      determining that customization is enabled for the content requested by the client device;
      obtaining the content layout profile from at least one of the client device or an external provider, the client device providing a reference to the content layout profile at the external provider in the negotiation;
      providing customized content to the client device; and
      receiving new customization parameters dynamically provided by a user of the client device when customizations of the customized content are not acceptable;
   formatting the content in accordance with the obtained dynamically configurable layout profile and the static content format information resulting from the client device negotiation; and
   sending the formatted content to the client device via the network.

2. The machine readable storage device of claim 1 and further comprising retrieving the dynamically configurable content layout profile from a remote storage device.

3. The machine readable storage device of claim 1 wherein the dynamically configurable content layout profile describes layout preferences including at least text, graphics, and multimedia content, and wherein the layout preferences include at least size, rotation, position preferences and video and graphics loading preferences.

4. The machine readable storage device of claim 1 wherein the profile describes layout preferences using a markup language.

5. The machine readable storage device of claim 4 wherein the markup language is a hypertext markup language.

6. The machine readable storage device of claim 5 wherein the hypertext markup language comprises an extended hypertext markup language version 5.

7. The machine readable storage device of claim 1 wherein the method further comprises:
receiving a dynamically modified profile;
reformatting the content based on the received modified profile; and
sending the reformatted content to the client device via the network.

8. A system for reformatting content to send to a client device, the system comprising:
a receiver, implemented in computer hardware, to receive a request for content from the client device via a network and obtain static content format information for the client device;
a negotiator module, implemented in computer hardware, to negotiate with the client device via the network regarding the layout of the content using a dynamically configurable content layout profile describing layout preferences for content when combined with the static content format information, wherein to negotiate with the client device includes the negotiator module to:
determine that customization is enabled for the content requested by the client device;
obtain the content layout profile from at least one of the client device or an external provider, the client device providing a reference to the content layout profile at the external provider in the negotiation;
provide customized content to the client device; and
receive new customization parameters dynamically provided b a user of the client device when customizations of the customized content are not acceptable;
a formatter, implemented in computer hardware, to format the content in accordance with the dynamically configurable layout profile and the static content format information that results from the client device negotiation; and
a transmitter, implemented in computer hardware, to send the formatted content to the client device via the network.

9. The system of claim 8 wherein the receiver is configured to retrieve the dynamically configurable content layout profile from a remote storage device.

10. The system of claim 8 wherein the dynamically configurable content layout profile describes layout preferences including at least text, graphics, and multimedia content, and wherein the layout preferences include at least size, rotation, position preferences and video and graphics loading preferences.

11. The system of claim 8 wherein:
receiver is configured to receive a dynamically modified profile;
the formatter is configured to reformat the content based on the modified profile; and
the transmitter is configured to send the reformatted content to the client device via the network.

12. The system of claim 8 wherein the profile describes layout preferences using a hypertext markup language.

13. The system of claim 12 wherein the hypertext markup language comprises an extended hypertext markup language version 5.

14. A method of reformatting content, the method comprising:
receiving a request for content from a client device via a network;
obtaining static content format information for the client device;
negotiating with the client device via the network regarding the layout of the content using a dynamically configurable content layout profile describing layout preferences for content when combined with the static content format information, the negotiating including:
determining that customization is enabled for the content requested by the client device;
obtaining the content layout profile from at least one of the client device or an external provider, the client device providing a reference to the content layout profile at the external provider in the negotiation;
providing customized content to the client device; and
receiving new customization parameters dynamically provided by a user of the client device when customizations of the customized content are not acceptable;
formatting the content in accordance with the dynamically configurable layout profile and the static content format information resulting from the client device negotiation; and
sending the formatted content to the client device via the network.

15. The method of claim 14 and further comprising retrieving the dynamically configurable content layout profile from a remote storage device.

16. The method of claim 14 wherein the dynamically configurable content layout profile describes layout preferences including at least text, graphics, and multimedia content, and wherein the layout preferences include at least size, rotation, position preferences and video and graphics loading preferences.

17. The method of claim 16 wherein the profile describes layout preferences using a hypertext markup language.

18. The method of claim 14 and further comprising:
receiving a dynamically modified profile;
reformatting the content based on the received modified profile; and
sending the reformatted content to the client device via the network.

19. A method of reformatting content, the method comprising:
sending a request for content via a client device to a server content provider that provides the content, the request enabling the server content provider to obtain static content information for the client device;
negotiating with the server content provider regarding the layout of the content using a dynamically configurable content layout profile describing layout preferences for content when combined with the static content format information, the negotiating including:
determining, from the server content provider, that customization is enabled for the content requested by the client device;

transmitting at least one of the content layout profile or a reference to the content layout profile at an external provider;

receiving customized content to the client device; and providing new customization parameters dynamically provided by a user of the client device when customizations of the customized content are not acceptable;

receiving content from the server content provider that is formatted accordingly to the static content information and the dynamically configurable content layout profile resulting from the client device negotiation; and displaying the received content according to the dynamically configurable content layout profile.

20. The method of claim 19 wherein the received content is fully laid out in accordance with the dynamically configurable content layout profile.

21. The method of claim 19 wherein the dynamically configurable content layout profile is stored on storage remote from the client device and is referenced by the client device during the negotiations with the server content provider.

22. The method of claim 21 wherein the storage includes profiles for at least one device and at least one corresponding user of the at least one device.

23. The method of claim 19 wherein the dynamically configurable content layout profile describes layout preferences for at least text, graphics, and multimedia content.

24. The method of claim 23 wherein the layout preferences include sensed client device orientation.

25. The method of claim 23 wherein the profile describes layout preferences using a hypertext markup language.

26. The method of claim 23 and further comprising:

providing an interface to users to facilitate changing of layout preferences while content is being displayed; and updating the display of the content based on the changed layout preferences.

27. The method of claim 26 wherein layout preferences for selected content are handled in a secure execution environment.

28. At least one non-transitory machine readable storage device having instructions stored thereon to cause a specifically programmed machine to implement a method or reformatting content, the method comprising:

sending a request for content via a client device to a server content provider;

negotiating with the server content provider regarding the layout of the content using a dynamically configurable content layout profile describing layout preferences for content, the negotiating including:

determining, from the server content provider, that customization is enabled for the content requested by the client device;

transmitting at least one of the content layout profile or a reference to the content layout profile at an external provider;

receiving customized content to the client device; and providing new customization parameters dynamically provided by a user of the client device when customizations of the customized content are not acceptable;

receiving content from the server content provider that is formatted accordingly to the static content information and the dynamically configurable content layout profile resulting from the client device negotiation; and displaying the received content according to the dynamically configurable content layout profile.

29. The machine readable storage device of claim 28 wherein the received content is fully laid out in accordance with the dynamically configurable content layout profile.

30. The machine readable storage device of claim 28 and further comprising:

providing an interface to users to facilitate changing of layout preferences while content is being displayed; and updating the display of the content based on the changed layout preferences.

* * * * *

UNITED STATES PATENT AND TRADEMARK OFFICE
CERTIFICATE OF CORRECTION

PATENT NO. : 10,057,369 B2
APPLICATION NO. : 13/993550
DATED : August 21, 2018
INVENTOR(S) : Poomachandran et al.

Page 1 of 1

It is certified that error appears in the above-identified patent and that said Letters Patent is hereby corrected as shown below:

In the Claims

In Column 13, Line 44, in Claim 8, delete "b" and insert --by-- therefor

In Column 13, Line 64, in Claim 11, before "receiver", insert --the--

Signed and Sealed this
Eleventh Day of June, 2019

Andrei Iancu
*Director of the United States Patent and Trademark Office*